US008763289B2

(12) United States Patent
Childs et al.

(10) Patent No.: US 8,763,289 B2
(45) Date of Patent: Jul. 1, 2014

(54) MULTI-SHEET ADVERTISING SYSTEM

(75) Inventors: Barry Childs, Anoka, MN (US); Paul Peterson, Cottage Grove, MN (US); Robert Pietila, Burlingame, CA (US)

(73) Assignee: Vomela Specialty Co, Inc., St. Paul, MN (US)

(*) Notice: Subject to any disclaimer, the term of this patent is extended or adjusted under 35 U.S.C. 154(b) by 57 days.

(21) Appl. No.: 13/482,038

(22) Filed: May 29, 2012

(65) Prior Publication Data

US 2012/0304514 A1 Dec. 6, 2012

Related U.S. Application Data

(60) Provisional application No. 61/492,656, filed on Jun. 2, 2011.

(51) Int. Cl.
*G09F 7/12* (2006.01)
*G06F 7/12* (2006.01)

(52) U.S. Cl.
CPC .................................. *G06F 7/12* (2013.01)
USPC ............................. 40/594; 40/615

(58) Field of Classification Search
None
See application file for complete search history.

(56) References Cited

U.S. PATENT DOCUMENTS

| 4,477,048 | A | | 10/1984 | Conway |
| 4,895,746 | A | * | 1/1990 | Mertens ..................... 428/40.2 |
| 5,073,424 | A | * | 12/1991 | Dressler ..................... 428/41.3 |
| 5,174,056 | A | | 12/1992 | King |
| 5,270,088 | A | | 12/1993 | Grasse |
| 5,641,550 | A | * | 6/1997 | Berman et al. ............... 428/40.9 |
| 5,771,619 | A | | 6/1998 | Wells |
| 6,068,903 | A | | 5/2000 | Volkert |
| 6,090,218 | A | | 7/2000 | Brackmann |
| 6,216,375 | B1 | | 4/2001 | Griffin |
| 6,219,876 | B1 | | 4/2001 | Blum |
| 6,531,021 | B1 | | 3/2003 | Loncar, Jr. et al. |
| 6,548,135 | B1 | * | 4/2003 | Hershey et al. .............. 428/40.1 |
| 6,714,837 | B1 | | 3/2004 | Brackmann et al. |
| 6,886,209 | B2 | | 5/2005 | Blum et al. |
| 6,948,272 | B1 | | 9/2005 | Olivier et al. |
| 7,064,847 | B1 | | 6/2006 | Kato |
| 7,073,762 | B2 | * | 7/2006 | Pearson .................. 248/346.01 |
| 7,323,235 | B2 | * | 1/2008 | Vaughn ..................... 428/40.1 |
| 8,460,789 | B1 | * | 6/2013 | Gift et al. ..................... 428/346 |
| 2009/0123685 | A1 | * | 5/2009 | Liu et al. ..................... 428/42.1 |

* cited by examiner

*Primary Examiner* — Kristina Junge
(74) *Attorney, Agent, or Firm* — Haugen Law Firm PLLP

(57) ABSTRACT

A point of purchase signage system for application upon a point of purchase unit includes a multiple sheet package having multiple distinct graphics for selective display at the point of purchase. The signage system may employ one or more packages in combination to involve a variety of advertising schemes. The signage system facilitates efficient marketing updates at the point of purchase.

6 Claims, 5 Drawing Sheets

MULTI-SHEET ADVERTISING SYSTEM

CROSS-REFERENCE TO RELATED APPLICATIONS

This application claims priority to U.S. Provisional Patent Application Ser. No. 61/492,656, filed on Jun. 2, 2011 and entitled "Multi-Sheet Advertising System," the content of which being incorporated herein in its entirety.

FIELD OF THE INVENTION

The present invention relates to point of purchase advertisements generally, and more particularly to point of purchase advertising systems which are directly applicable to existing point of purchase displays, including product storage and display units.

BACKGROUND OF THE INVENTION

Point of purchase advertising displays have long been used to market products in proximity to a location at which the advertised products are available for purchase. Point of purchase advertising strategies include increasing product awareness, communicating special offers in connection with the sale of the advertised products, and other techniques to drive consumer attention to the respective products.

A variety of point of purchase advertising devices have been employed. Examples include posters or other visual materials supported by separate display devices such as poster stands and display housings, free-standing advertising displays, and devices affixable to product shelving. A problem common among such conventional point of purchase advertising devices is the requirement to replace the display each time a new promotion is to be advertised by the product vendor. As a consequence, advertising displays must be frequently assembled and disassembled in changing the advertising display in accordance with changing promotions for the respective products. This requires significant time and effort, particularly for establishments that utilize many point of purchase advertising displays at any given time.

It is therefore an object of the present invention to provide a point of purchase signage system that is capable of sequentially displaying a plurality of distinct advertising schemes without having to disassemble and re-assemble the signage system.

It is a further object of the present invention to provide a point of purchase signage system that is adapted to be removably securable directly to a point of purchase unit, such as product shelving, product containers, and product refrigeration units.

It is a yet further object of the present invention to provide a point of purchase signage system that is adapted to be removably adhered to a point of purchase unit for selectively displaying one or more of a plurality of unique advertising schemes displayable from the single signage system.

SUMMARY OF THE INVENTION

By means of the present invention, a plurality of distinct advertising schemes may be selectively displayed through a single point of purchase signage system that is specifically adapted to be removably securable to a point of purchase unit, such as product containers, product display shelving, and product refrigeration units. The point of purchase signage system involves a multiple-sheet package, in which each sheet graphically depicts an advertising scheme, and one or more sheets may be readily removed to reveal distinct graphical displays depicting a different advertising scheme than that promoted by the one or more advertising sheets removed from the package. Through such an arrangement, therefore, the product advertiser may inexpensively and efficiently present multiple distinct advertising schemes for one or more products in a single advertising package that is easily placed at the point of purchase.

In one embodiment, a point of purchase signage system includes a package having a rear mounting surface and a plurality of stacked graphic sheets, with each of the graphic sheets having a graphics side, an opposed rear side, and a perimeter edge. The graphic sheets are removably adhered to an adjacent one of the sheets by a first adhesive for removably connecting adjacent sheets, wherein the first adhesive is disposed in a first adhesive pattern on the rear sides of the respective graphic sheets. The first adhesive pattern includes the first adhesive only along a perimeter portion of the rear side extending inwardly from the perimeter edge by less than about 5 cm. Each of the graphics sides of the graphic sheets have graphics distinct from one another so as to each display a unique advertising scheme. The graphics of at least a second and subsequent sheets of the graphic sheets are disposed at the respective graphic sheets within a graphics pattern that does not overlap the first adhesive pattern on an adjacent facing rear side of an adjacent sheet of the stacked graphic sheets. The package further includes a second adhesive being disposed at the rear mounting surface for securing the package to the point of purchase unit.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
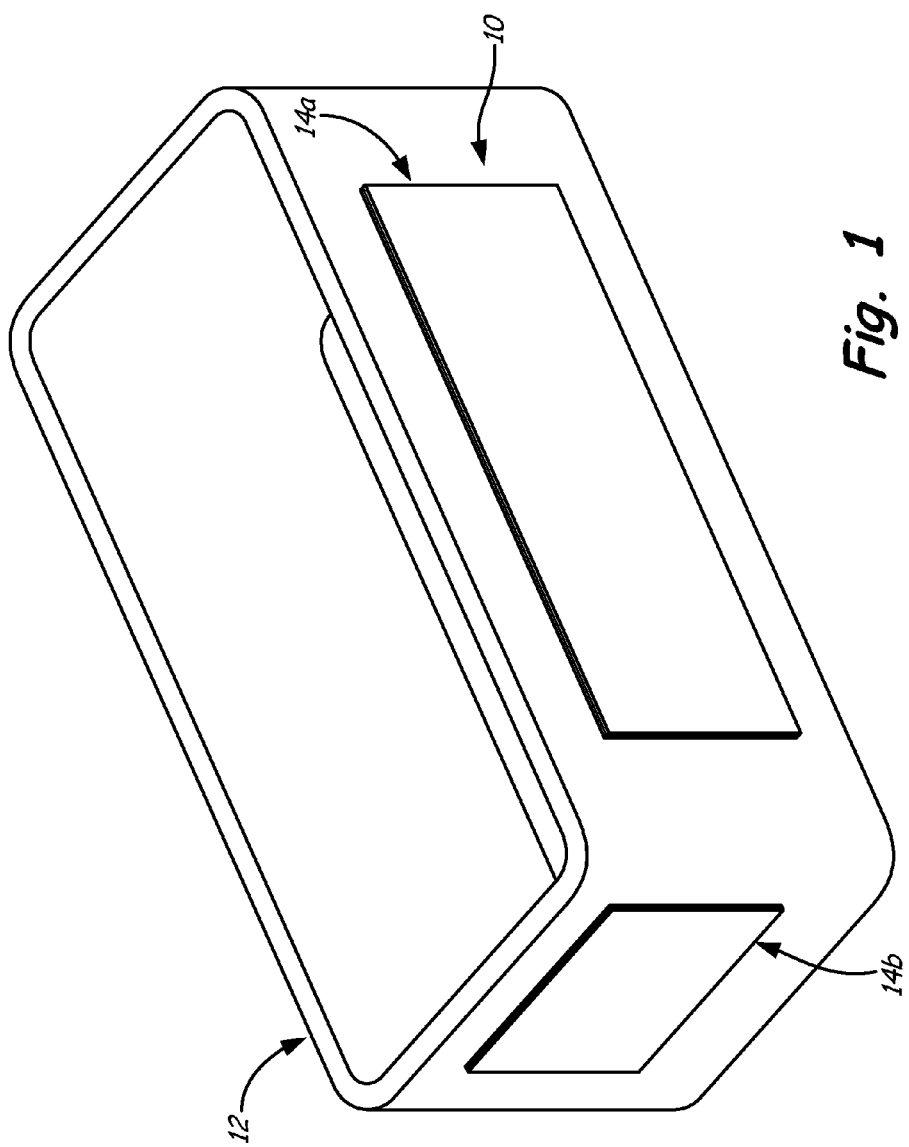
FIG. 1 is an illustration of a point of purchase signage system applied to a point of purchase unit.
Figure 2:
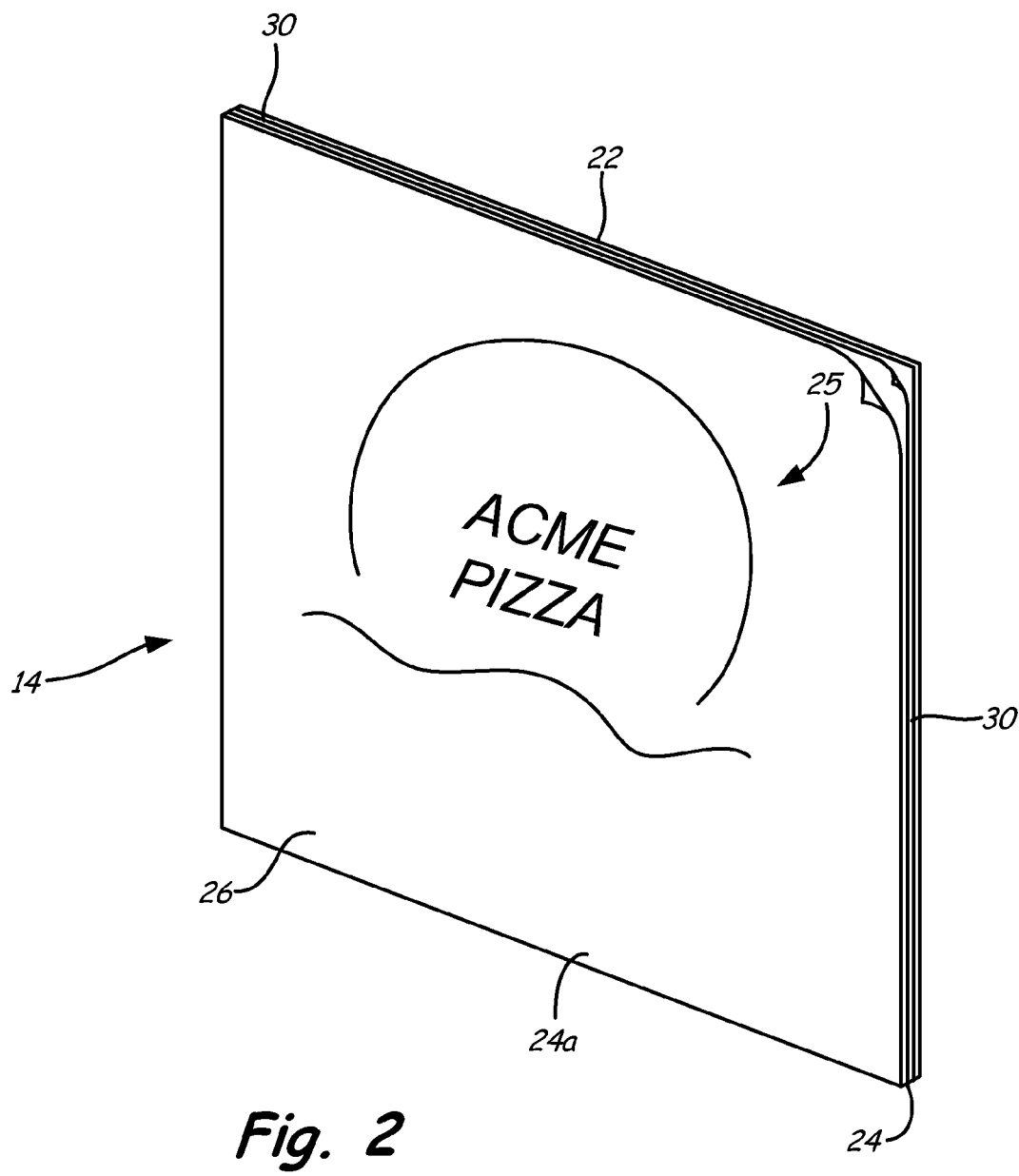
FIG. 2 is an illustration of a point of purchase signage system of the present invention.

With reference now to the drawings, and first to FIG. 1, a point of purchase signage system 10 is adapted for application upon a point of purchase unit 12 for selective advertising thereat. Point of purchase unit 12 may be any of a variety of structures, mechanisms, and devices embodying a point of purchase at which products and/or services are available for purchase. In the illustrated embodiment, point of purchase unit 12 is a refrigeration unit, such as an open-top freezer in which perishable grocery items are sold in, for example, a grocery or convenience store. It is to be understood, however, that the present invention contemplates the signage system 10 being usable in connection with point of purchase units other than the open-top freezer illustrated in FIG. 1.

In the embodiment of FIG. 1, point of purchase signage system 10 includes packages 14a, 14b independently secured to point of purchase unit 10. In one aspect of the present invention, one or more packages 14 may be utilized in connection with a single point of purchase unit 12 to display identical, similar, complementary, coordinating, and/or independent advertising schemes to promote products available for purchase from point of purchase unit 12. As will be described in greater detail hereinbelow, a particular aspect of the present invention is the capability to simultaneously exhibit selected advertising schemes directly from the three-dimensional point of purchase unit. Packages 14 of the present invention facilitate the use of various combinations of advertising schemes at a single point of purchase location. For example, a first package 14a may display a first advertising scheme while package 14b displays an advertising scheme that is complementary to, or independent from the first advertising scheme. In this manner, product promoters may coordinate advertising efforts to simultaneously promote distinct products available for sale at a single point of purchase unit 12. As an example, a food vendor may advertise frozen pizzas at package 14a, while advertising frozen breadsticks at package 14b to encourage consumers to purchase both from point of purchase unit 12. In other examples, product vendors may advertise similar or identical products at packages 14a, 14b to enhance visibility of the advertising from different vantage points within the store. Overall, the point of purchase signage system 10 affords product promoters significant flexibility and prominence in being directly securable to one or more surfaces of a three-dimensional point of purchase unit 12.

A package 14 of point of purchase signage system 10 includes a rear mounting surface 22 and a plurality of stacked graphic sheets 24 (24a-24x). In some embodiments, the stacked graphic sheets 24 of package 14 may be in the form of a pad or other structure in which each graphic sheet 24 of package 14 substantially equally overlaps adjacent graphic sheets 24. However, it is to be understood that packages 14 of the present invention may include graphic sheets 24 of varying sizes. Graphic sheets 24 may preferably include graphics 25 applied at least to graphics sides 26 thereof. In some embodiments, graphics 25 may be printed upon graphics side 26 through known techniques. For example, graphics 25 may be screen printed with the ink printed through a 380 mesh, 87 lines per inch press at 50-60% relative humidity and 60-70° F. using, for example, a fast cure ink available from FujiFilm Sericol. Other embodiments utilize digital imprinting with a Sericol S20 press at between 600-1000 dpi. Applicants have determined that a suitable graphics substrate is styrene, with a thickness of about 0.01 in. Other substrates, inks, and application techniques, however, are contemplated as being useful in the present invention. Graphic sheets 24 may be monolayer or multi-layer structures such as laminates, with graphics side 26 being suitable for reception and display of graphics 25. In one embodiment, graphic sheets 24 are mono-layer styrene sheets having a thickness of about 0.01 in.

Figure 4:
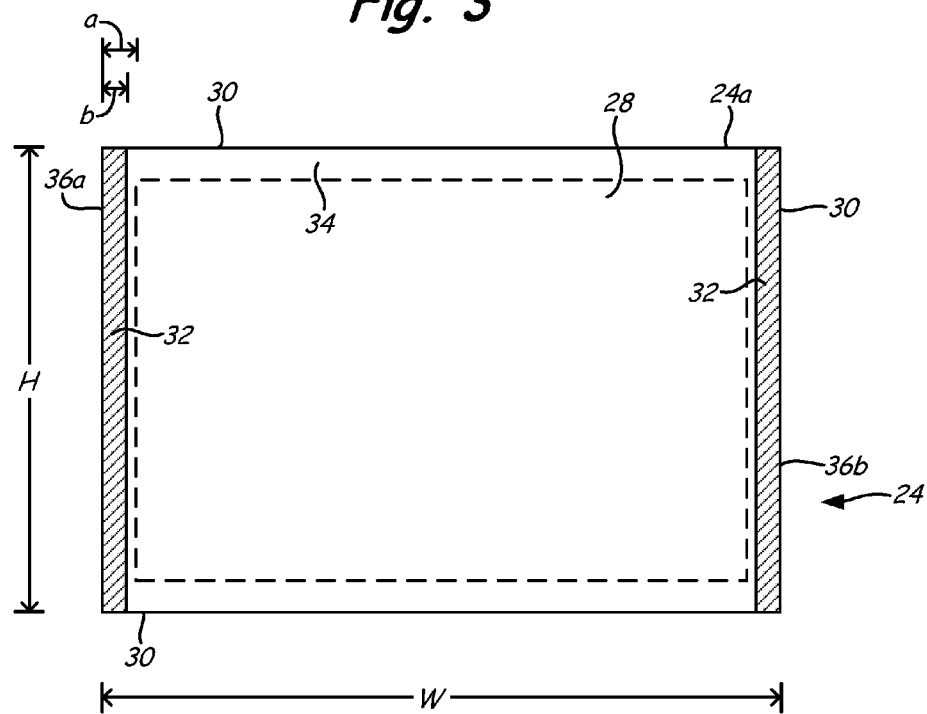
FIG. 4 is an illustration of a portion of the point of purchase signage system illustrated in FIG. 2.

Each of graphic sheets 24 include graphics side 26, an opposed rear side 28, and a perimeter edge 30. Each of graphic sheets 24 may be removably adhered to an adjacent one of graphic sheets 24 by a first adhesive 32 disposed in a first adhesive pattern on rear sides 28 of respective graphic sheets 24. The first adhesive pattern includes first adhesive 32 only along a perimeter portion 34 of rear side 28 extending inwardly from perimeter edge 30 by less than about 5 cm. Perimeter portion 34 extends about a perimeter of rear side 28 to define a margin within which first adhesive 32 may be disposed on rear side 28. It is contemplated that first adhesive 32 need not extend throughout a perimeter of rear side 28, nor throughout a full perimeter width dimension "a" of perimeter portion 34. Thus, for example, in the embodiment in FIG. 4, first adhesive 32 may be applied with a maximum width "b" that is smaller than perimeter width "a" of perimeter portion 34. As indicated above, perimeter portion 34 may extend inwardly from perimeter edge 30 by a width dimension "a" of less than about 5 cm. In one embodiment, first adhesive 32 may be applied along at least a portion of a perimeter of rear side 28 to extend inwardly from perimeter edge 30 by about 1 cm. In one embodiment, width dimension "b" of first adhesive 32 is 0.375 in. Other width dimensions for first adhesive 32, however, are contemplated as being useful in the present invention, such as to assist in the stable support of the removable adhesion among the plurality of graphic sheets 24 in package 14.

It is an aspect of the present invention to provide first adhesive 32 only at perimeter portion 34 of rear side 28. First adhesive 32 may be disposed continuously or discontinuously along perimeter portion 34, and may be uniform or non-uniform in width dimension "b" while remaining within perimeter portion 34. In the illustrated embodiment, first adhesive 32 is applied only at first and second edge portions 36a, b of perimeter portion 34. Applicants have determined that, for some embodiments, such first adhesive pattern for first adhesive 32 is sufficient for removably adhering rear side 28 of one graphic sheet 24 to a graphics side 26 of an adjacent graphic sheet 24. It is an aspect of the invention that the extent of area coverage of first adhesive 32 of perimeter portion 34 be minimized not only for cost savings, but also to minimize the marginalization of graphics pattern 38 on graphics side 26, as will be described in greater detail hereinbelow. The goal of minimizing the extent of coverage of first adhesive 32 is offset by the need for securely removably adhering adjacent graphics sheets 24 to one another, and particularly providing an adhesion strength which accommodates the respective adhered weight of graphic sheets 24.

It is contemplated that graphic sheets 24 may be provided in a variety of dimensions and configurations, each of which exhibiting a weight that must be removably supported by the adhesion provided by first adhesive 32. In one example embodiment, width "W" of graphic sheet 24 may be between about 5 and 100 in, and height "H" of graphic sheet 24 may be between 5 and 100 inches. It is also contemplated that graphic sheets 24 may assume a variety of configurations, including polygonal and non-polygonal shapes. Accordingly, each graphic sheet 24 may exhibit a weight corresponding to its size, and which must be supported in the mutual engagement among adjacent graphic sheets 24 by first adhesive 32. Consequently, it is envisioned that a variety of adhesive coverage extents on rear side 28 and adhesive strengths may be utilized in the packages of the present invention.

First adhesive 32 may include one or more adhesive materials, and may, for example, comprise a two-sided adhesive structure, with a first side including a first adhesive material, and a second side including a second adhesive material. Such distinct adhesive materials of first adhesive 32 may have similar or dissimilar adhesion properties, including adhesion strengths, cure mechanisms, material compatibilities, and the like. For example, first adhesive 32 may comprise an adhesive system in which a first side adherable to rear side 28 of graphic sheet 24 has a higher adhesion force than a second side of first adhesive 32 securable to an adjacent graphics side 26 of an adjacent graphic sheet 24. The relatively higher adhesion force of the first side of first adhesive 32 adherable to rear side 28 of graphic sheet 24 may ensure that first adhesive 32 remains at rear side 28 upon the disengagement of adjacent graphic sheets 24 from one another, and particularly inhibiting adhesion retention at graphics side 26 subsequent to disengagement of the adjacent graphic sheets 24. In addition, rear side 28 of graphic sheet 24 may be of a different material than graphics side 26 of an adjacent graphic sheet 24, wherein adhesive materials may be selected for first adhesive 32 that are compatible with the respective materials of rear side 28 and graphics side 26 of adjacent graphic sheets 24.

In one embodiment, first adhesive 32 may be a dual-sided film tape with a "permanent" adhesive on a first side, and a "removable" adhesive on the second side of the film tape, available from Duraco, Inc. of Forrest Park, Ill. under the trade name Remo One Film. Applicants have determined that an example adhesion force exhibited by first adhesive 32 in removably adhering to an adjacent graphics side 26 of an adjacent graphic sheet is between about 1-20 oz/in, while the "permanent" adhesive material adhesion strength adhering first adhesive 32 to rear side 28 may be between about 5-80 oz/in. However, it is to be understood that certain embodiments of the present invention may utilize adhesives with adhesion force values beyond the ranges described herein. The example adhesion force value ranges described herein have been determined by the Pressure Sensitive Test Council (PSTC) test no. 101.

Graphics sides 26 of graphic sheets 24 may include graphics 25 applied thereto. In one embodiment, each graphics side 26 of the plurality of graphic sheets 24 of package 14 includes graphics 25 which are distinct from one another so as to display a unique advertising scheme for each graphic sheet 24. The unique graphics 25 for each graphic sheet 24 provides an advantageous point of purchase advertising system, wherein a new and different advertising scheme may be introduced merely by removing one or more graphic sheets 24 from package 12. For instance, a first advertising scheme displayed at front graphic sheet 24a may promote the sale of a first product, while an underlying second graphic sheet 24b may promote a second product distinct from the first product. In other cases, first and second graphic sheets 24a, 24b may promote the same product, but through distinct approaches. Front graphic sheet 24a may, for example, merely promote the sale of a respective product through heightened consumer awareness, while a second graphic sheet 24b may promote the sale of such product, or a different product, or the combination of products, through a specific time-limited discount offer. As may be readily understood, a wide variety of promotional schemes may be employed through the multiple-sheet package 14 of the present invention.

Figure 3:
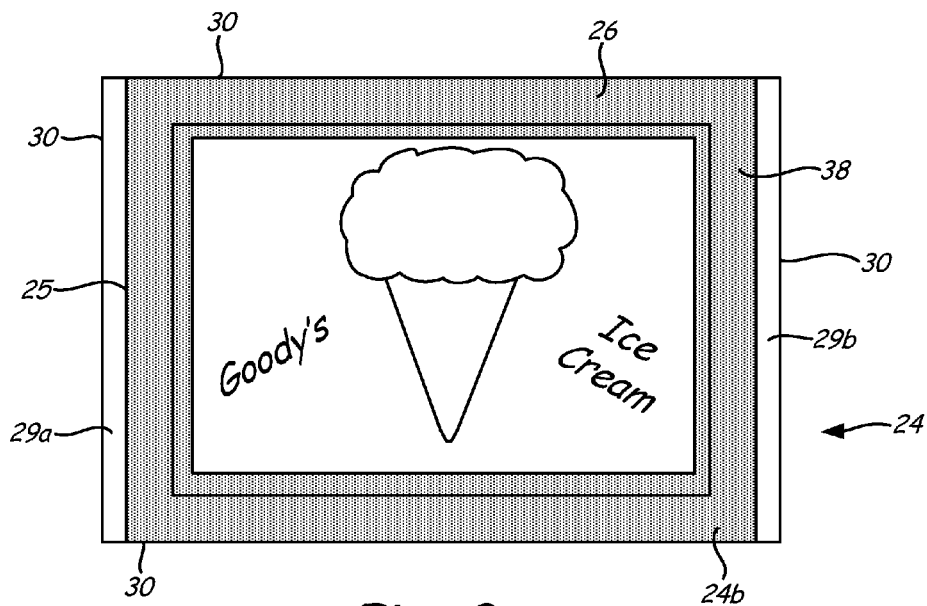
FIG. 3 is an illustration of a portion of the point of purchase signage system illustrated in FIG. 2.

The graphics 25 of at least a second and subsequent graphic sheets 24b-x of package 14 may be disposed at respective graphics sides 26 within a graphics pattern that does not overlap the first adhesive pattern on an adjacent facing rear side 28 of an adjacent sheet 24 of package 14. An example graphics pattern of graphics 25 is illustrated in FIG. 3, wherein such graphics pattern does not overlap the first adhesive pattern of first adhesive 32 at rear side 28 of an adjacent graphic sheet 24a. In particular, graphics 25 at graphics side 26 of graphic sheet 24b contains non-printed margins 29a, 29b substantially corresponding to the first adhesive pattern at rear side 28 of graphic sheet 24a. Non-printed margins 29a, 29b may be equal to, or slightly wider than adhesive width "b" of first adhesive 32. Applicants have determined that non-printed margins 29a, 29b may be employed to accomplish a number of benefits in the execution of packages 14. For example, non-printed margins 29a, 29b corresponding to the first adhesive pattern of an adjacent rear side 28 of an adjacent graphic sheet 24 eliminates the possibility of damage to graphics 25 during the separation of graphic sheet 24a from graphic sheet 24b, in that first adhesive 32 is removably secured to graphics side 26 of graphic sheet 24b only at non-printed margins 29a, 29b. Consequently, first adhesive 32 does not "pull-up" ink from graphics side 26 because first adhesive 32 is not in contact with graphics 25. Additionally, adhesion force of the removable adhesion between graphic sheet 24a and graphic sheet 24b is not compromised by the presence of graphics 25 at the interface between first adhesive 32 and graphics side 26 of the graphic sheet 24b. Consistent and adequate adhesions may therefore be accomplished through the interaction of first adhesive 32 directly upon the non-printed margin 29a, 29b of graphics side 26.

Because front graphic sheet 24a may not require application of another graphic sheet 24 to graphics side 26 thereof, it is contemplated that graphics side 26 of front graphic sheet 24a may include graphics 25 throughout an entire surface thereof. It is therefore only the second and subsequent graphic sheets 24b-24x which may employ a graphics pattern with non-printed margins 29a, 29b, or any other graphics pattern which does not overlap the corresponding first adhesive pattern on a rear side 28 of an adjacent facing graphic sheet 24. It is therefore clear that the extent of coverage of first adhesive 32 is minimized so as to limit the size of non-printed margins 29a, 29b. Packages 14 of the present invention accomplish such goal by limiting perimeter portion 34 to less than about 5 cm inward from perimeter edge 30.

Figure 5:
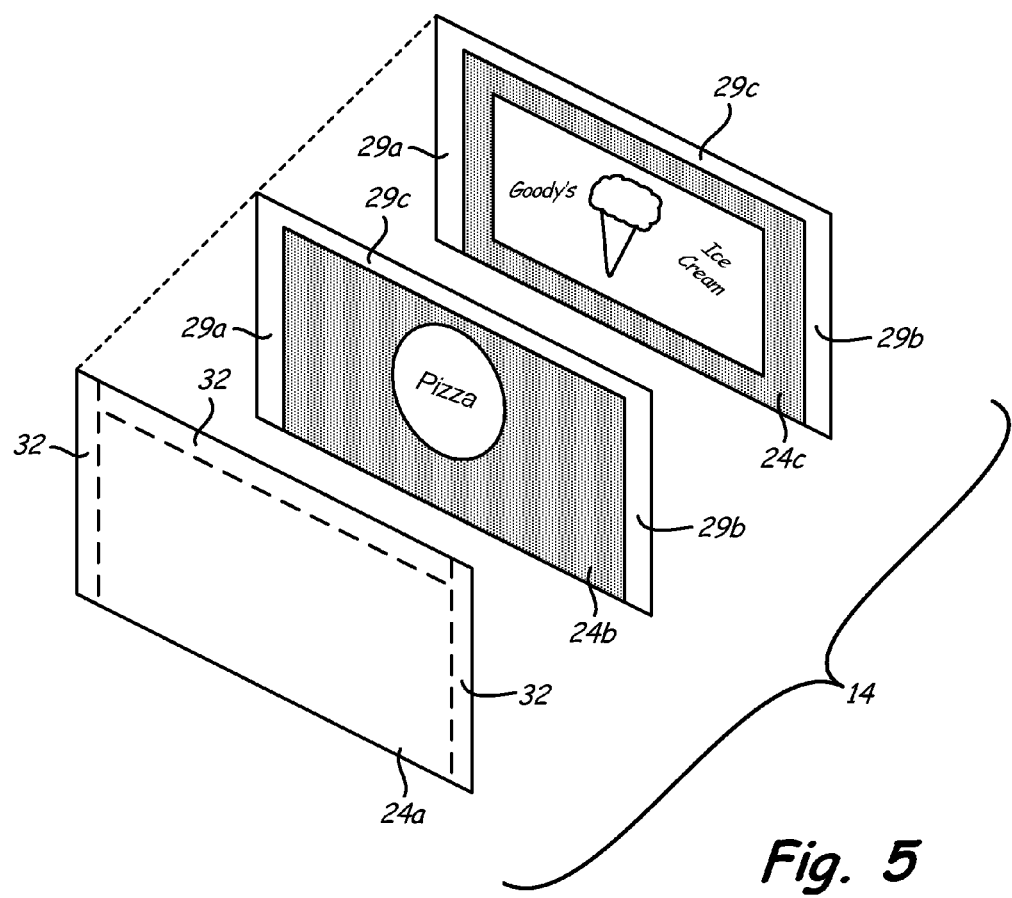
FIG. 5 is an exploded view of a point of purchase signage system of the present invention.

An exploded view of a package 14 of the present invention is illustrated in FIG. 5, wherein the first adhesive pattern of first adhesive 32 at graphic sheet 24a coordinates with non-printed margins 29a, 29b, 29c at graphic sheet 24b. A similar relationship between a first adhesive pattern at graphic sheet 24b with a graphics pattern at graphic sheet 24c exists such that the first adhesive at rear side 28 of graphic sheet 24b overlaps only with non-printed margins 29a, 29b, 29c of graphic sheet 24c.

Figure 6:
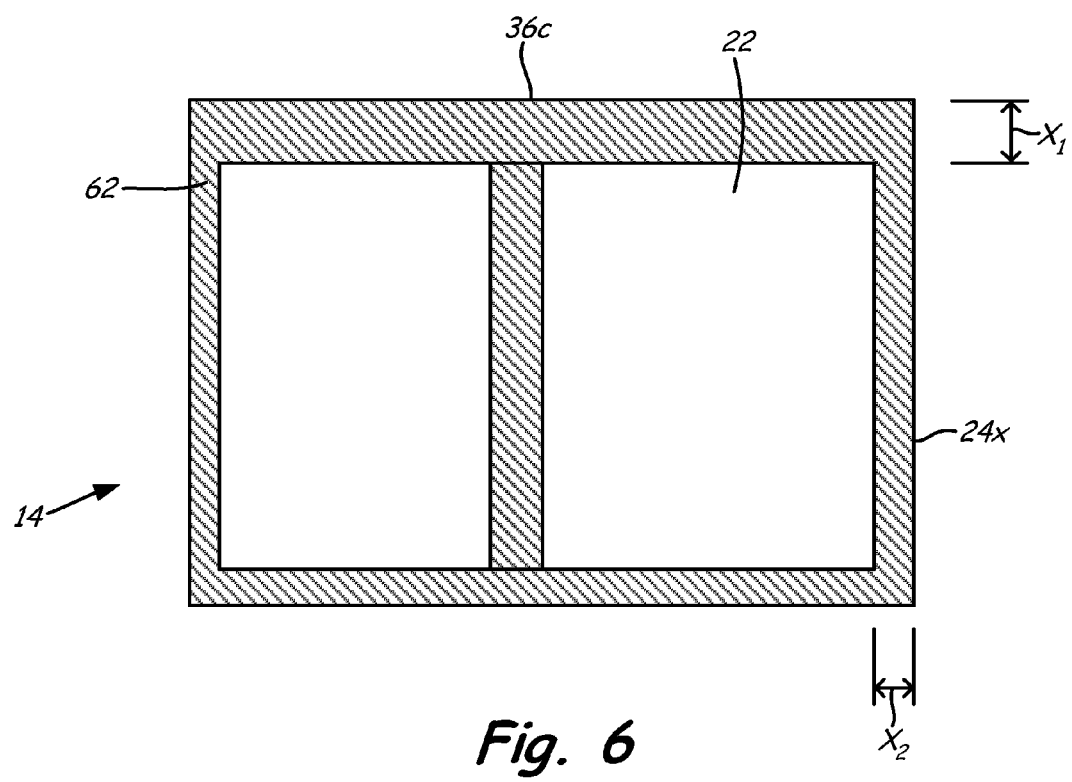
FIG. 6 is an illustration of a portion of a point of purchase signage system of the present invention.

In order to securely yet removably attach package 14 to a point of purchase unit 12, rear mounting surface 22 includes a second adhesive 62. An example arrangement for rear mounting surface 22 of package 14 is illustrated in FIG. 6. Second adhesive 62 may be applied to rear mounting surface 22 in a variety of configurations suitable for removably securing package 14 to point of purchase unit 12. In the illustrated embodiment, second adhesive 62 may extend from upper perimeter edge 36c by dimension "$X_1$" of about 1.5 in, and from first and second perimeter edges 36a, 36b by a dimension "$X_2$" of about 0.75 in, and optionally at one or more locations within the area of rear mounting surface 22 defined by perimeter edge 30. In some embodiments, rear mounting surface 22 is a rear side 28 of the rear-most graphic sheet 24x. In other embodiments, however, rear mounting surface 22 may be part of a separate body, including of a material other than that used for graphic sheets 24.

In one embodiment, second adhesive 62 may be a dual-coated adhesive tape available from 3M Company of St. Paul, Minn. under the trade name "Removable/Repositionable Tape 9425". Such adhesive may include a first relatively "high tack" adhesive material on one side of the tape, with a "medium tack" adhesive material on the other side of the UPVC carrier tape. An example "high tack" adhesive material may have an adhesion strength of, for example, between 5-80 oz/in, and may be adherable to rear mounting surface 22, while an example "medium tack" adhesive material may have an adhesion strength of, for example, between 10-20 oz/in, and may be arranged for securement to point of purchase unit 12. In such a manner, package 14 may be applied and removed from a point of purchase unit 12 without leaving adhesive residue thereat. In particular, the relatively stronger adhesion force of the "high tack" adhesive material maintains adhesion between second adhesive 62 and rear mounting surface 22, and permits separation of second adhesive 62 from point of purchase unit 12. It is contemplated that one or more second adhesive 62 may be employed at rear mounting surface 22 in order to facilitate the removable positioning of packages 14 at point of purchase unit 12.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A point of purchase signage system for application upon a point of purchase unit, said signage system comprising:
a package having a rear mounting surface and a plurality of stacked graphic sheets, with each of said graphic sheets having a graphics side, an opposed rear side, and a perimeter edge, and being removably adhered to an adjacent one of said sheets by a first adhesive, said first adhesive being disposed in a first adhesive pattern on said rear sides of respective said graphic sheets, wherein said first adhesive pattern includes said first adhesive only along a perimeter portion of said rear side extending inwardly from said perimeter edge by less than about 5 cm, each of said graphics sides of said graphic sheets having graphics distinct from one another so as to each display a unique advertising scheme, said graphics of at least a second and subsequent sheets of said package being disposed at said respective graphic sheets within a graphics pattern that does not overlap said first adhesive pattern on an adjacent facing rear side of an adjacent sheet of said stacked graphic sheets, said package further including a second adhesive disposed at said rear mounting surface for securing said package to the point of purchase unit.

2. A point of purchase signage system as in claim 1 wherein said graphics are printed upon said respective graphic sheets.

3. A point of purchase signage system as in claim 1, including a plurality of packages securable to the point of purchase unit.

4. A point of purchase signage system as in claim 1 wherein said graphic sheets are individually removable from said package to selectively reveal different of said advertising schemes.

5. A point of purchase signage system as in claim 1 wherein said first adhesive includes first and second sides, including a first adhesive material of a first adhesion peel strength disposed at said first adhesive side to adhere to said rear side of a first one of said stacked graphic sheets, and a second adhesive material of a second adhesion peel strength disposed at said second adhesive side to adhere to said graphics side of a second one of said stacked graphic sheets adjacent to said first one of said stacked graphic sheets, wherein said second adhesion peel strength is lower than said first adhesion strength.

6. A point of purchase signage system as in claim 5 wherein said first adhesion peel strength is between 5-80 oz/in, and said second adhesion peel strength is between 1-20 oz/in.

* * * * *